US012537617B2

(12) United States Patent
Portwood et al.

(10) Patent No.: US 12,537,617 B2
(45) Date of Patent: Jan. 27, 2026

(54) COMMUNICATIONS BETWEEN NETWORKED AUDIO DEVICES

(71) Applicant: Shure Acquisition Holdings, Inc., Niles, IL (US)

(72) Inventors: Jonathan Portwood, Vernon Hills, IL (US); Kehang Wu, Wilmette, IL (US); Steve Leib, Evanston, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 223 days.

(21) Appl. No.: 18/223,766

(22) Filed: Jul. 19, 2023

(65) Prior Publication Data

US 2024/0031048 A1 Jan. 25, 2024

Related U.S. Application Data

(60) Provisional application No. 63/391,061, filed on Jul. 21, 2022.

(51) Int. Cl.
*H04J 3/06* (2006.01)

(52) U.S. Cl.
CPC .................. *H04J 3/0635* (2013.01)

(58) Field of Classification Search
CPC ..... H04J 3/0635; H04J 3/0632; H04L 65/764; H04L 65/80
See application file for complete search history.

(56) References Cited

U.S. PATENT DOCUMENTS

| 6,057,789 | A | 5/2000 | Lin |
| 6,975,655 | B2 | 12/2005 | Fischer et al. |
| 7,084,898 | B1 * | 8/2006 | Firestone ............... H04N 7/152 348/14.09 |
| 7,224,756 | B2 | 5/2007 | Subramoniam et al. |
| 7,239,581 | B2 | 7/2007 | Delgado et al. |
| 7,714,631 | B2 | 5/2010 | Edde |
| 7,869,420 | B2 | 1/2011 | Tighe et al. |
| 8,059,688 | B2 | 11/2011 | Stanton et al. |
| 8,576,922 | B2 | 11/2013 | Moss et al. |
| 8,582,442 | B2 | 11/2013 | Walley et al. |
| 8,705,680 | B2 | 4/2014 | Terada et al. |

(Continued)

FOREIGN PATENT DOCUMENTS

GB 2485977 A 6/2012

OTHER PUBLICATIONS

Olsson, Bengt J., "Timing Challenges for Media Production and Transport over the Wide Area Network," Conference paper, Feb. 2018, 9 pages.

(Continued)

*Primary Examiner* — Phung-Hoang J Nguyen
(74) *Attorney, Agent, or Firm* — Banner & Witcoff, Ltd.

(57) ABSTRACT

An audio device may be connected to a communication network. The audio device may send or receive audio data via a network, based on a network clock that may be synchronized with other audio device connected to the network. The audio device may buffer, convert between digital audio signals and analog audio signals, encrypt, decrypt, packetize, depacketize, compress, and/or decompress audio data using a local asynchronous media clock using a relatively lower precision clocking technology such as a crystal-based oscillator.

16 Claims, 5 Drawing Sheets

(56) References Cited

U.S. PATENT DOCUMENTS

| | | |
|---|---|---|
| 8,819,472 B1 | 8/2014 | Muscha et al. |
| 8,996,906 B1 | 3/2015 | Townley et al. |
| 9,094,564 B2 | 7/2015 | Soldan |
| 9,219,938 B2 | 12/2015 | Snow |
| 9,367,081 B2 | 6/2016 | Herbeck et al. |
| 9,420,332 B2 | 8/2016 | Abrol et al. |
| 9,429,980 B2 | 8/2016 | Yuenyongsgool et al. |
| 9,479,573 B2 | 10/2016 | White et al. |
| 9,524,264 B2 | 12/2016 | Amon et al. |
| 9,804,633 B2 | 10/2017 | Rajapakse et al. |
| 9,979,998 B1 * | 5/2018 | Pogue .............. H04N 21/43637 |
| 10,261,539 B2 | 4/2019 | Bal et al. |
| 10,341,792 B1 * | 7/2019 | Zhang .................. H04R 27/00 |
| 10,571,953 B2 | 2/2020 | Fayneh et al. |
| 10,679,673 B2 | 6/2020 | Møller et al. |
| 10,841,842 B2 | 11/2020 | Hori et al. |
| 10,936,009 B2 | 3/2021 | Jang et al. |
| 10,979,209 B1 | 4/2021 | Sluyski et al. |
| 10,979,757 B2 | 4/2021 | Fleischer et al. |
| 11,022,999 B2 | 6/2021 | You et al. |
| 2003/0161347 A1 | 8/2003 | Metchalf |
| 2010/0061406 A1 | 3/2010 | Tatsuta et al. |
| 2010/0067531 A1 * | 3/2010 | Thiems ................ H04J 3/0664 370/395.62 |
| 2010/0115322 A1 | 5/2010 | Petrick |
| 2011/0234200 A1 | 9/2011 | Shenoi |
| 2013/0117597 A1 | 5/2013 | Batson et al. |

OTHER PUBLICATIONS

Williams, A, et al., "RTP Clock Sourcing Signalling," Internet Engineering Task Force (IETF), Jun. 2014, 30 pages.

Oct. 23, 2023—(WO) International Search Report and Written Opinion—App PCT/US2023/028338.

Hodson O et al: "Skew detection and compensation for Internet audio applications", Multimedia and Expo, 2000. ICME 2000. 2000 IEEE International Conference on New York, NY, USA Jul. 30-Aug. 2, 2000, Piscataway, NJ, USA, IEEE, US, vol. 3, Jul. 30, 2000 (Jul. 30, 2000), pp. 1687-1690, XP010512834, DOI: 10.1109/ICME. 2000.871096 ISBN: 978-0-7803-6536-0.

Laur C et al: "Synchronous Techniques for Timing Recovery in Bison", Communication for Global Users. Including a Communications Theory Mini Conference. Orlando, Dec. 6-9, 1992; [Proceedings of the Global Telecommunications Conference (GLOBECOM)], New York, IEEE, US, vol. 1-02-03, Dec. 6, 1992 (Dec. 6, 1992), pp. 814-820, XP000357678, DOI: 10.1109/GLOCOM. 1992.276407 ISBN: 978-0-7803-0608-0.

A. Williams, K Gross, R Van Brandenburg, H Stokking: "RTP Clock Source Signalling; rfc7273.txt", RTP Clock Source Signalling; rfc7273.txt, Internet Engineering Task Force, IETF; Standard, Internet Society (ISOC) 4, Rue Des Falaises CH—1205 Geneva, Switzerland, Jul. 1, 2014 (Jul. 1, 2014), pp. 1-30, XP015100728, [retrieved on Jul. 7, 2014].

* cited by examiner

COMMUNICATIONS BETWEEN NETWORKED AUDIO DEVICES

CROSS-REFERENCE TO RELATED APPLICATIONS

The present application claims priority to U.S. provisional patent application Ser. No. 63/391,061, filed Jul. 21, 2022, which is incorporated by reference herein as to its entirety.

BACKGROUND

Some audio systems are designed to provide high performance audio over Internet Protocol (IP) capabilities. For example, the AES-67 standard provides audio device manufacturers with a way to interoperate in an audio over IP solution that transmits and receives professional quality audio, such as uncompressed PCM 24 bit audio sampled at 48 kilohertz (KHz), at extremely low latencies. Such professional quality and low latency can come at a cost. In particular, such systems involve relatively complex circuitry and/or software, numerous expensive parts, high network bandwidth utilization, and other costs.

SUMMARY

The following summary presents a simplified summary of certain features. The summary is not an extensive overview and is not intended to identify key or critical elements.

While the above-mentioned costs of professional quality audio with extremely low latency may be worth incurring in certain situations, for some market segments the quality of audio needed and the latency needs may be lower or less restrictive. Thus, the costs may be excessive for the perceived benefit. An example would be in the audio-conferencing space. The audio needs of the average voice-grade audio teleconference may differ from the more exacting needs of a major pop star's touring act. Off the shelf solutions, such as standards-based voice-over-IP (VoIP), may not offer the degree of fidelity that users expect. These standards can often be telephony grade and follow IT or internet standards. Moreover, an exacting phase-accurate and sample-accurate audio transmission typically requires a precision clocking hardware module to be designed into an audio product. For a variety of reasons (for example, ongoing semiconductor shortages currently being experienced and/or supply chain or other economic conditions), these types of hardware modules may sometimes be extremely difficult or expensive to procure. It would be desirable to provide an audio solution that may fit a middle ground between high performance audio solutions and telephony grade or IT based solutions, and that does not incur costs to design and build that are inappropriate for a given needed level of audio quality and latency. Such a solution may not utilize such a precision clocking hardware module at all, while still meeting the needs of various audio contexts (such as teleconferencing, video conferencing, public address systems, etc.). For example, such a solution may selectively and carefully relax one or more bandwidth, quality, and/or latency requirements that existing high-performance audio over IP solutions require. Such a solution may continue to offer best in class audio performance while doing so at a potentially much lower implementation, complexity, and/or utilization cost.

For example, in some high-performance systems, network clocks are closely synchronized to a global network clock, and other internal clocks are derived from the closely-synchronized network clock. This is typically achieved using a complex and expensive precision hardware clocking module. Such highly synchronized clocking mechanisms are used to control analog-to-digital conversion and digital-to-analog conversion processes, as well as packetization and de-packetization of packets. This assists the system to have high performance in terms of latency. As an alternative, however, one or more local clocks may be simply let to run in an asynchronous fashion, as will be described herein. For example, a local clock, such as a local media clock, may be asynchronous to all other clocks (for example, may be independently generated) and may be used to drive one or more processes such as analog-to-digital audio conversion, digital-to-analog audio conversion, packetization, and/or depacketization. The use of one or more such local asynchronous clocks may allow for a significantly simpler and less expensive audio device while still achieving audio quality and latency expectations appropriate to certain types of audio applications.

For example, some aspects as described herein may involve an audio system in which multiple audio devices may be in communication with one another. For example, a first audio device may send and/or receive data (e.g., audio and/or other information) to and/or from a second audio device, and the second audio device may send and/or receive data (e.g., audio and/or other information) to and/or from the first audio device. The audio devices may be communicatively connected to one another via a communication medium, which may involve a direct connection between audio devices, an indirect connection between audio devices, and/or a communication network. The connection(s) amongst the audio devices may be, for example, IP based. For example, the one or more audio devices may send and/or receive data to and/or from another of the audio devices in a plurality of packets, such as IP packets, via the communication medium. One or more of the audio devices may operate in accordance with multiple clocks. For example, the sending and/or receiving of packets between the audio devices may be performed in accordance with (e.g., sent and/or received based on the frequency and/or phase of) a first clock. The first clock may be, for example, based on a master clock shared by the audio devices such as via the communication medium. The one or more audio devices may further convert analog signals (such as analog audio signals) to digital data and/or convert received digital data (such as digital audio or other data) to analog signals in accordance with (e.g., sent and/or received based on the frequency and/or phase of) a second clock. The second clock may be asynchronous from (for example, independently generated from) the first clock. The one or more audio devices may further packetize digital data to be sent and/or de-packetize digital data that is received in accordance with (e.g., sent and/or received based on the frequency and/or phase of) the first clock or the second clock.

According to further aspects as described herein, a method may be performed by an audio device. The method may comprise receiving an analog audio signal based on detected sound, and generating a local asynchronous media clock, using for example a local oscillator such as a crystal-based oscillator, a microelectromechanical system oscillator (MEMS), a ceramic resonator, a surface acoustic wave (SAW) oscillator, an inductor/capacitor (LC) oscillator, or another type of unsynchronized clocking implementation. The local asynchronous media clock may not need to have a high precision. For example, the local asynchronous media clock may have a frequency variation that is at least one part per million, or at least ten parts per million, or at least one hundred parts per million. By way of example, it is typical for an off-the-shelf crystal-based oscillator to have a frequency variation in the range of ten parts per million to one hundred parts per million at room temperature (e.g., at about 20 degrees Celsius). As discussed below, there is no need for the local asynchronous media clock to be extremely precise, which may be expected to effectively translate to "expensive" "and/or "complex." For example, there is no need for an extremely precise chip atomic clock to implement the local asynchronous media clock. Rather, a less expensive, less complex, and/or more readily available technology may be used to implement the local asynchronous media clock, for both transmitting and receiving audio. The method may further comprise generating, using the local asynchronous media clock and based on the analog audio signal, digital audio data. A master clock of a network connected to the audio device may be used to generate a network clock. For example, the network clock may be synchronized with the master clock. The audio device may send the digital audio data via the network, based on the network clock.

According to further aspects as described herein, a method may be performed by an audio device. The method may comprise receiving, via a network and based on a network clock that is synchronized with a master clock of the network, digital audio data. The method may further comprise generating a local asynchronous media clock using, for example, a local oscillator such as a crystal-based oscillator, a MEMS, a ceramic resonator, a SAW oscillator, an LC oscillator, or another type of unsynchronized clocking implementation. As discussed above and further herein, the local asynchronous media clock may have a precision such that it may have a frequency variation that is at least one part per million, or at least ten parts per million, or at least one hundred parts per million. The method may further comprise generating, using the local asynchronous media clock and based on the digital audio data, an analog audio signal. The method may further comprise generating sound, such as by using a speaker, based on the analog audio signal.

Further aspects as described herein are directed to audio devices that perform the above method and other methods, systems that comprise two or more of the audio devices, and computer-executable instructions (for example, software and/or firmware) that, when executed cause an audio device to perform the above method or other methods.

These and other features and potential advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
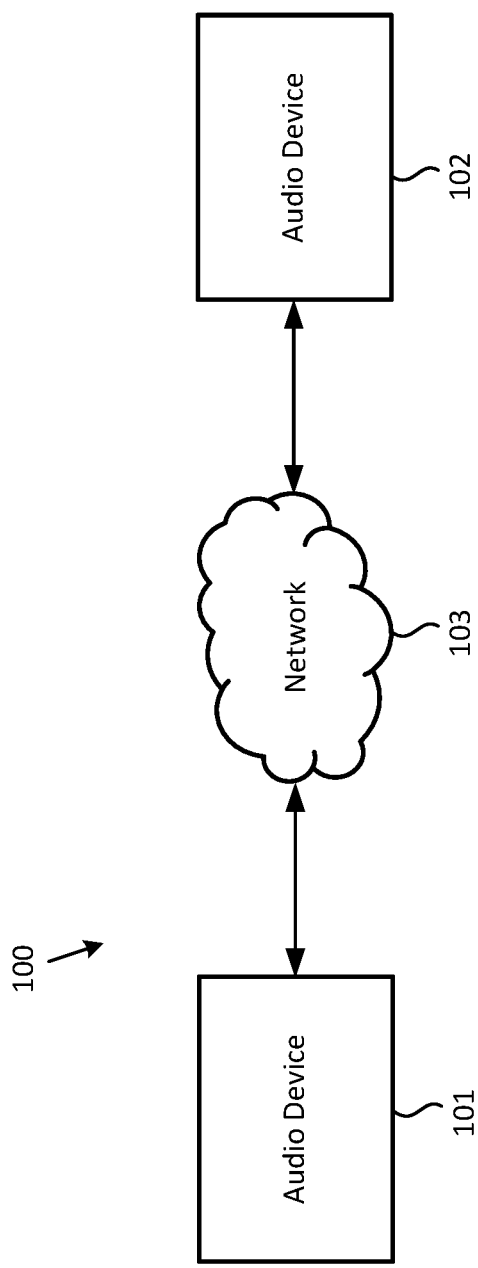
FIG. 1 is a block diagram of an example audio system.

The accompanying drawings, which form a part of the description herein, show examples of the disclosure. It is to be understood that the examples shown in the drawings and/or discussed herein are non-exclusive and that there are other examples of how the disclosure may be practiced.

FIG. 1 is a block diagram of an example audio system 100. The audio system 100 may comprise a plurality of audio devices, such as audio device 101 and audio device 102. The plurality of audio devices may be communicatively coupled to one another via a communication medium such as a communication network 103. The audio devices may be any types of devices that are capable of sending, receiving, and/or processing (e.g., modifying, storing, and/or operating in response to, audio) audio. Non-limiting examples of audio devices include devices that are, or that include, microphones, speakers, conferencing equipment, audio recorders, personal computers, servers, display devices (e.g., television or computer displays), networking devices, audio mixers, and musical instruments. Thus, for example, the audio device 101 may be or otherwise include a microphone, and the audio device 102 may be or otherwise include a speaker. Audio data that is generated based on sound detected by the microphone may be sent by the audio device 101, via the communication network 103, to at least the audio device 102. The audio device 102 may accordingly cause its speaker to generate sound based on the received audio data. This is but one example—as another example, each of the audio devices 101 and 102 may include both a microphone and a speaker. As a further example, the audio device 101 may include a microphone and the audio device 102 may include a computing device configured to store audio data received from the audio device 101. As a further example, the audio devices 101 and 102 may each be elements of a teleconferencing or videoconferencing system. As a further example, the audio devices 101 and 102 may each be elements of a public address system. While two audio devices are shown in FIG. 1, this is merely an example, and the system 100 may include any plural number of audio devices, such as three audio devices, four audio devices, or more, interconnected via the communication network 103.

The communication network 103 may be any type of network (including a simple connection between audio devices) using any one or more protocols. For example, the communication network 103 may utilize Internet Protocol (IP) to carry data such as audio data in IP datagrams. The communication network 103 may send those IP datagrams using a particular data link layer protocol, such as Ethernet. This combination of IP and Ethernet is known as IP Over Ethernet (IPoE), in which data (such as audio data) is placed in IP datagrams, and the IP datagrams are encapsulated in Ethernet frames. The term "packet" will be used herein to include various organized groupings of data, such as but not limited to datagrams (for example, User Data Protocol (UDP) datagrams) and frames.

Each of the audio devices may be configured to send, via the communication network 103, data to one or more other audio devices. Each of the audio devices may further be configured to receive, via the network 103, data from one or more other audio devices. Any of the audio devices may be configured to both send and receive data, or to exclusively send data, or to exclusively receive data. For example, the audio device 101 may be configured to send and/or receive data via the network 103 to and/or from the audio device 102, and the audio device 102 may be configured to send and/or receive data via the network 103 to and/or from the audio device 101. The data sent between the audio devices may include audio data, video data, communication control data, system control data, audio processing parameter data, and/or any other types of data.

Figure 2:
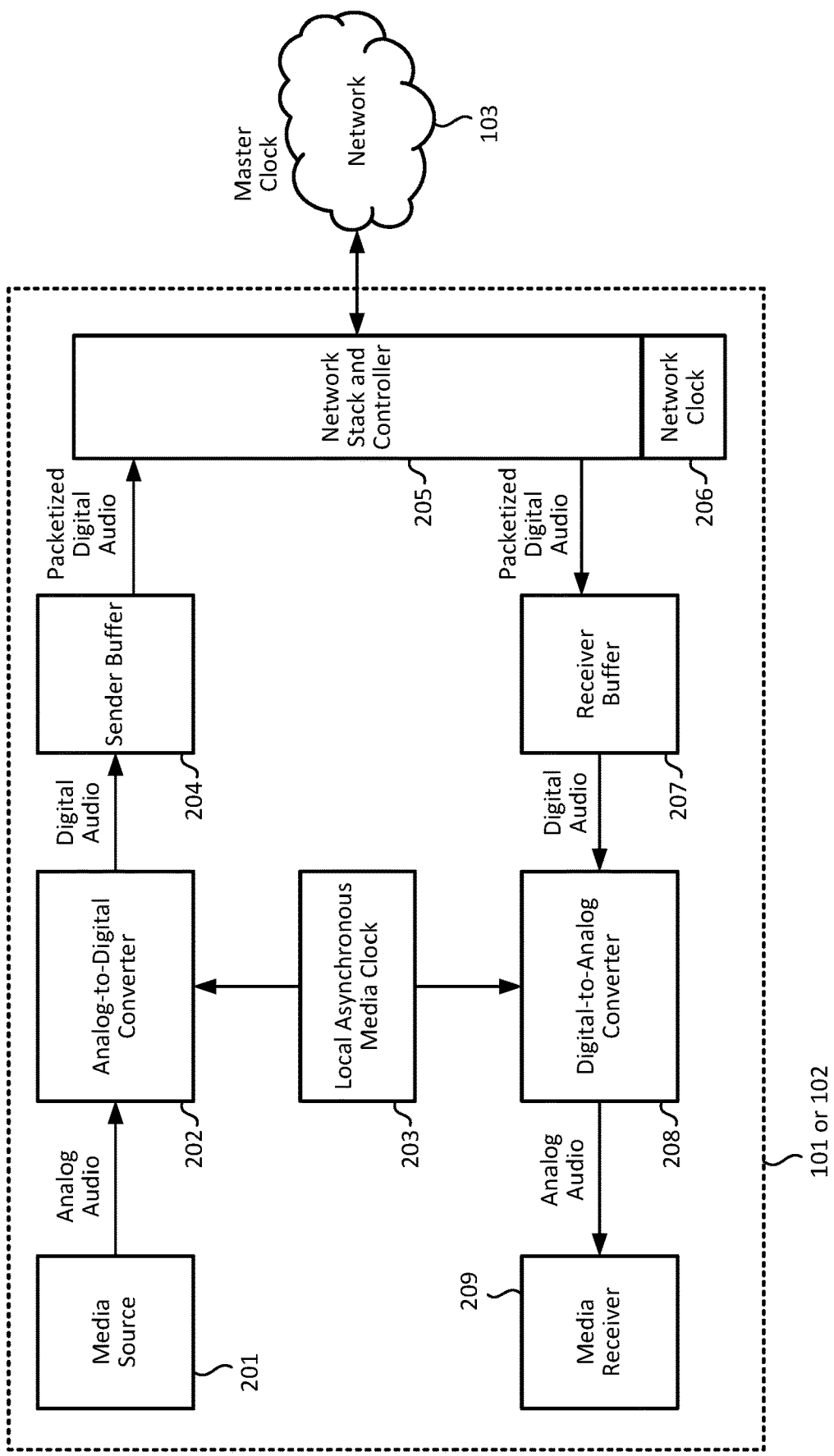
FIG. 2 is a block diagram showing example details of an audio device that may be part of an audio system, such as the audio system of FIG. 1.

FIG. 2 is a block diagram showing example details of an audio device that may be part of an audio system, such as the audio system 100 of FIG. 1. For example, the audio device shown in FIG. 2 may be the audio device 101 or the audio device 102. The audio device, in this example, may include or otherwise be connected to a media source 201. The media source 201, which may be internal to a housing of the audio device or external to the housing, may be any type of media source such as a microphone, musical instrument, storage device containing pre-recorded audio, speakerphone, telephone, or any other device capable of generating or providing an audio signal such as the analog audio signal that is provided to the ADC 202.

The media source 201 may generate an audio signal representing audio, which may be an analog audio signal. The analog audio signal may be sent to an analog-to-digital converter (ADC) 202. The ADC 202 may convert the analog audio signal to a digital audio signal, which may be sent to a sender buffer 204. The ADC 202 may operate in accordance with (e.g., be governed by) a local clock that is asynchronous to any other clock used by the audio device. For example, the ADC 202 may sample the analog audio signal at a sampling rate that is based on (e.g., equal to) the clock rate of the asynchronous local clock. This asynchronous clock will be referred to herein as a local asynchronous media clock 203. The local asynchronous media clock 203 may be a clock having a particular nominal frequency, for example a nominal frequency of about 32 kHz or a nominal frequency of about 48 kHz, or any other nominal frequency as desired. The ADC 202 may generate digital data, based on the analog audio signal, at the frequency of the local asynchronous media clock 203. For example, if the local asynchronous media clock 203 is a clock having a nominal frequency of F hertz (Hz), then the ADC 202 may sample the analog audio signal with a nominal sampling rate of F Hz, generating data (e.g., a byte of data) for each sample. Thus, the ADC 202 may generate the digital audio signal at the frequency of the local asynchronous media clock 203, by generating a nominal F bytes of data (or some other amount of data) per second.

The term "nominal" is used in the above discussion, because the local asynchronous media clock 203 does not need to be an extremely accurate clock, and does not need to be synchronized with any other accurate clock (or indeed with any other clock at all, regardless of accuracy). For example, the local asynchronous media clock 203 may be implemented as, or otherwise include, a local oscillator such as a crystal-based oscillator, for example a piezoelectric crystal and/or circuitry for operating the crystal. As further examples, the crystal-based oscillator may be or otherwise include a temperature compensated crystal oscillator (TCXO) or a voltage controlled crystal oscillator (VCXO). When voltage is applied to a crystal-based oscillator, the crystal may oscillate at a particular frequency F. That frequency F may be the frequency of the local asynchronous media clock 203, which may be represented as a time-varying voltage signal. The frequency F may be fixed (for example, with a nominally stable frequency by using a TCXO or by using a VCXO having a fixed voltage input), or the frequency F may be adjustable such as by implementing the local asynchronous media clock 203 as a VCXO with an adjustable voltage input. As further examples, the local asynchronous media clock 203 may be implemented as a microelectromechanical system oscillator (MEMS), a ceramic resonator, a surface acoustic wave (SAW) oscillator, an inductor/capacitor (LC) oscillator, or another type of unsynchronized clocking implementation.

Regardless of the implementation, the local asynchronous media clock 203 may have a frequency and a phase (offset) that is asynchronous from (independent of) any other clock used by the audio device and/or by the audio system 100. There are many potential advantages to using a crystal-based oscillator (or MEMS, ceramic, SAW, or LC oscillators, for example) to implement the local asynchronous media clock 203. When compared with certain other high-precision clock generation devices, such as chip atomic clocks or clocking chips synchronized with external precision clocking sources, such oscillators may provide a clock having less precision and/or less accuracy. While such oscillators generally have a stable nominal frequency, using such clocking technologies may result in the local asynchronous media clock 203 having a frequency variation that is at least one part per million, or at least ten parts per million, or at least one hundred parts per million. Their relative variance in clock frequency and phase may be a factor in designing receiver buffer and/or sender buffer sizes to reduce the possibility of buffer overflow. However, these are tradeoffs that may be worthwhile in certain audio applications where extremely high audio quality and extremely high audio synchronization are not needed, such as but not limited to telephone conferencing, video conferencing, public address systems, etc. When compared with such precision clock generation devices, these types of lower-precision oscillators are relatively inexpensive, require less circuit board real estate, involve less complexity in both design and manufacture, and consume less power. While all of these factors may be advantageous to any audio device, some may be especially advantageous to an audio device that is portable and/or battery-powered and thus space and/or power-limited. Moreover, as will be discussed below, using an oscillator having a lower designed or expected precision may provide simplicity, in that the exact frequency of the local asynchronous media clock 203 may not be very important to achieve the intended purpose of the audio device and/or the audio system. This simplicity and flexibility in the implementation of a local media clock that is asynchronous in each audio device 101 and/or 102 may allow the audio device to not include, for example, a phase-locked loop (PLL) that might otherwise be used to synchronize the local media clocks with one another. In a system in which multiple devices are communicating (such as a first device 101 sending audio data and a second device 102 receiving the sent audio data), the first and second devices may have their own local asynchronous media clocks that are, by their very nature, not necessarily in synchrony with each other. Regardless of the type of clock used to implement the local asynchronous media clocks, the first and second devices may nevertheless be able to effectively send and receive the audio data using the techniques described herein, while managing the receiving buffer to potentially avoid receiving buffer under-runs and over-runs.

The digital audio signal generated by the ADC 202 may be received by the sender buffer 204, which may temporarily store audio data of the digital audio signal. The sender buffer 204 may be any type of buffer, such as a first-in first-out (FIFO) buffer. The sender buffer 204 may output its stored audio data in a plurality of portions, by packetizing each portion of the stored audio data into a packet, such as an IP datagram, and sending each packet as packetized digital audio to a network stack and controller 205. The sender buffer may compress, encrypt, and/or packetize the buffered digital audio data, and send the compressed, encrypted, and/or packetized digital audio data to the network stack controller 205, at a rate that is governed by either the local asynchronous media clock 203 or by another clock, which will be referred to herein as a network clock 206. Any compression scheme and/or encryption scheme may be used to compress and/or encrypt the digital audio data. For example, the digital audio data may be encrypted using AES-128 counter mode encryption or AES-256 counter mode encryption. Consistent with the discussion above, the local asynchronous media clock 203 may be completely independent from (asynchronous from) the network clock 206. In other words, the frequency and phase of the local asynchronous media clock 203 may be completely independent from, and operate at its own frequency and phase regardless of, the frequency and phase of the network clock 206. Moreover, because the local asynchronous media clock 203 of each audio device 101 or 102 is of relatively low precision, it may be expected that the local asynchronous media clock 203 of the audio device 101 may be of a different nominal frequency as the local asynchronous media clock 203 of the audio device 102. The difference in these nominal frequencies may be on the order of plus-or-minus at least one part per million, or at least ten parts per million, or at least one hundred parts per million. Moreover, even if their respective nominal frequencies were the same, their actual frequencies over time may be expected to be different from one another, where their instantaneous or average frequencies at various given times may be expected to be different from one another by plus-or-minus at least one part per million, or at least ten parts per million, or at least one hundred parts per million.

The network stack and controller 205 may act as an interface between the audio device and the network 103. Thus, audio data packets (e.g., IP datagrams) received by the network stack and controller 205 from the sender buffer 204 may be reformatted for the network 103 and sent via the network 103. For example, the network stack and controller 205 may reformat the audio data IP datagrams at least by encapsulating the IP datagrams in Ethernet frames. The network stack and controller 205 may send any packets it receives from the sender buffer 204 to the network 103. The network stack and controller 205 may further label the packets (for example, the IP datagrams and/or the Ethernet frames) with sequence numbers and/or with timestamps that are based on the network clock 206, where the network clock 206 may be generated based on (for example, generated to be in synchronization with) a master clock associated with the network 103. For example, the network stack and controller 205 may generate the network clock 206 based on the master network clock in accordance with the Precision Time Protocol (PTP) as specified in IEEE 1588-2008 (PTP Version 2) or IEEE 1588-2019. For example, in accordance with PTP, the master clock of the network 103 may act as a synchronization reference (e.g., a grandmaster clock), and the network clock 206 may be generated to have a frequency and phase based on (e.g., equal to) the frequency and phase of the master clock. Thus, the network clock 206 may be synchronized with, or otherwise generated based on, the master clock.

Consistent with the discussion above, the local asynchronous media clock 203 for any given audio device in the audio system 100 may be completely independent from (asynchronous from) the network's 103 master clock. In other words, the frequency and phase of the local asynchronous media clock 203 may be completely independent from, and operate at its own frequency and phase regardless of, the frequency and phase of the master clock. Moreover, the network clock 206 may be generated by the audio device based on (for example, to be synchronized in both frequency and phase with) the master clock of the network 103.

As mentioned above, the packets to be sent to the network 103 may be labeled with timestamps and/or sequence numbers by, for example, the network stack and controller 205. The timestamps may be, for example, PTP timestamps. The timestamps may be generated based on the network clock 206 or the master clock of the network 103, and may be generated in accordance with RFC 7273. For example, each timestamp may have a value that is based on the value of the network clock 206 associated with the packet, such as a value of the network clock 206 when the packet is generated or sent. The network clock 206 need not have a hardware-precision timestamp capability and may be implemented, for example, in software to save on complexity and external parts. The sequence numbers may be incremented (such as by a value of 1) for each packet to be sent. At a receiving end (e.g., packets received by the audio device 102 that were generated by the audio device 101), the timestamps and/or sequence number may be used to organize the various incoming packets, even while the local asynchronous media clock 203 of each audio device remains free-running in an asynchronous fashion. Such a hybrid configuration of using synchronized clocking for certain interactions between the audio devices 101 and 102 while using asynchronous clocking for certain internal processing within each of the audio devices 101 and 102, may save in complexity and may allow the audio device hardware and software to be simpler. When packets are received by another audio device 101 or 102 via the network 103, the timestamps and/or sequence numbers in each received packet may be read and used to determine what order they should be received, buffered, and/or processed in, even in the presence of variable network 103 latency.

In addition to, or as an alternative to, sending audio data to the network 103, the audio device 101 or 102 may receive audio data from the network 103. In the example shown in FIG. 2, the network stack and controller 205 may receive network packets (e.g., Ethernet frames encapsulating audio data packets such as IP datagrams) containing audio data, and may send the audio data packets to a receiver buffer 207. which may de-packetize (for example, extract the audio data from the data packets), decompress as needed, decrypt as needed, and temporarily store the extracted and decompressed and/or decrypted audio data. The receiver buffer 207 may be any type of buffer, such as a FIFO buffer, and may be combined with the sender buffer 204 or implemented as a completely separate buffer. The receiver buffer 207 may de-packetize the audio data packets (e.g., the IP datagrams) received form the network stack and controller 205 by extracting audio data from the audio data packets and storing the audio data in the receiver buffer 207. The de-packetizing may be performed in accordance with (e.g., be governed by) the network clock 206 or by the local asynchronous media clock 203. As discussed above, the audio data packets may include timestamps and/or sequence numbers, which may be used by the receiving audio device to determine the correct order in which the audio packets are to be processed. For example, the audio data extracted from a given audio data packet may be stored at a location, and/or in an order, in the receiver buffer 207 that corresponds to (e.g., is indexed by or otherwise associated with) the timestamp and/or the sequence number of the audio data packet. In doing so, the receiver buffer 207 may ensure that the contents of the various packets are processed (e.g., converted to an analog audio signal) in the correct order, even if a later-sent packet is received prior to an earlier-sent packet due to network 103 delays. In further examples, the receiver buffer 207 may store audio data in the order that it is received, such as in a first-in first-out (FIFO) arrangement.

The receiver buffer 207 may send portions of its stored audio data to a digital-to-analog converter (DAC) 208, which may convert the digital audio data to an analog audio signal. The DAC 208 may operate in accordance with (for example, its operation may be governed by) the local asynchronous media clock 203. For example, the DAC 208 may receive (for example, pull or extract) the digital data stored in the receiver buffer 207 at a rate that is based on the frequency of the local asynchronous media clock 203. For example, if the local asynchronous media clock 203 is a clock having a frequency of F Hz, then the DAC 208 may receive digital audio data from the receiver buffer 207 and convert the digital audio data to an analog audio signal at the frequency of the local asynchronous media clock 203, by converting F bytes of data per second to an analog signal. While the local asynchronous media clock 203 is shown in FIG. 2 as providing the local asynchronous media clock signal to the ADC 202 and the DAC 208, the local asynchronous media clock signal may be provided to any one or more elements of the audio device 101 or 102, as desired. Moreover, while the local asynchronous media clock 203 is shown in FIG. 2 to be connected with other elements in a particular way, and is shown as a unique element in the figure, the local asynchronous media clock 203 may be located anywhere within or outside of the sending chain (which includes at least elements 201, 202, 204, and 205), anywhere within or outside of the receiving chain (which includes at least elements 205, 207, 208, and 209), and/or as part of any of the other elements of FIG. 2.

The DAC 208 may send the generated analog audio signal to a media receiver 209. The media receiver 209, which may be internal to the housing of the audio device or external to the housing, may be any type of media receiver such as a speaker, audio storage device, speakerphone, telephone, or any other device capable of receiving and/or processing an audio signal such as the analog audio signal generated by the DAC 208. The media receiver 209 may be a separate device from the media source 201, or the two devices may be integrated as a single same device. For example, a speakerphone may include both a media source (e.g., its microphone and related circuitry) and a media receiver (e.g., its speaker and related circuitry). In some examples, the media source 201 and the media receiver 209 may be co-packaged as a same device as the remaining circuitry of the audio device 101 or 102. For example, a single housing may enclose, or at least partially enclose, any or all of the elements 201-209 illustrated in FIG. 2. In other examples, the media source 201 and/or the media receiver 209 may be physically separate from, while communicatively connected with, a device containing any of the remaining elements 202-208. In such examples, the analog audio signal from the media source 201 to the ADC 202 and/or the analog audio signal from the DAC 208 to the media receiver 209 may be communicated via external ports and/or cabling. Moreover, the audio device 101 or 102 may include only a subset of the elements illustrated in FIG. 2. For example, the audio device 101 or 102 may be configured to send audio to the network 103 and not receive audio from the network 103, or the audio device 101 or 102 may be configured to receive audio from the network 103 and not send audio to the network 103. In these examples, the audio device 101 or 102 may include at least elements 202-206 (and possibly 201) and not elements 207-209, or the audio device 101 or 102 may include at least elements 203 and 205-208 (and possibly 209) but not elements 201, 202, and 204.

As mentioned previously, when packets are received by an audio device via the network 103, the timestamp and/or sequence number in each received packet may be read and used to determine what order each packet should be read, buffered, and/or processed in, relative to the other received packets, even in the presence of variable network 103 latency. The timestamps and/or sequence numbers may also be used to detect dropped packets. For example, assume that two packets are sent by the audio device 101 to the audio device 102, in which a first one of the packets has a first timestamp and/or a first sequence number and is sent by the audio device 101 prior to sending a second one of the packets having a second timestamp and/or a second sequence number. Even if the second packet is received by the audio device 102 prior to receiving the first packet (due to, for example, variable latency in the network 103), the audio device 102 will be able to properly re-order the incoming first and second packets in its receiver buffer 207 based on their respective timestamps and/or sequence numbers, such that the audio device 102 may buffer the first packet in front of the second packet (for example, in the receiver buffer 207) so that the first packet is processed (for example, converted from digital to analog using the DAC 208) prior to processing the second packet. To accomplish this, the receiving audio device 102 may store audio data for each of the packets in the receiver buffer 207 in an order and/or storage location that is based on their respective timestamps and/or sequence numbers. Moreover, the buffered audio data may be retrieved from the receiver buffer 207 and sent to the DAC 208 in an order that is based on their respective storage locations within the receiver buffer 207. For example, if the receiving audio device 102 determines that the second sequence number is more than one sequence number away from the first sequence number (e.g., one or more skipped sequence number values in between the first sequence number value and the second sequence number value), then the receiving audio device 102 may determine that one or more packets have been dropped (for example, lost in route to the receiving audio device 102 or otherwise unreceived by the receiving audio device 102). The receiving audio device 102 may determine the amount of dropped packets based on the number of sequence numbers that are missing from the received packets. For example, if the received packets include sequence numbers of [1, 2, 6, 7, 8, 9, . . . ], then the receiving audio device 102 may determine that packets with sequence numbers 3, 4, and 5 are missing, and thus that three packets have been dropped. The receiving audio device 102 may determine that the one or more packets are dropped further based on a time period passing after which the packet(s) containing the one or more sequence numbers are not received as expected. For example, if there is a third sequence number value that is between the first and second sequence number values, and a packet containing the third sequence number value is not received after a threshold period of time from the packet containing the first sequence number or the second sequence number, then the receiving audio device 102 may determine that the packet containing the expected third sequence number has been dropped. If the audio device 102 determines that a packet has been dropped, the audio device 102 may fill in its receiving buffer with a manufactured set of data in place of where the data from the dropped packet would have been stored, or may perform some other action such as generating a signal indicating a dropped packet, where that signal may be used to indicate a dropped packet status to a user of the audio device 102, for example.

As another example, the receiving audio device 102 may use timestamps to determine whether one or more packets have been dropped. The receiving audio device 102 may be configured with an expected time between packets, or with an expected packet transmission rate from which an expected time between packets may be derived (based on an inverse of the expected packet transmission rate). The expected packet transmission time between packets may be predetermined, or it may be determined dynamically by the receiving audio device 102 such as by measuring the packet rate and/or time between packets and averaging those values over a sliding window of time. However, the expected time between packets is determined, the receiving audio device 102 may store a value of that expected time between packets, referred to herein as $T_{EP}$. If the receiving audio device 102 receives packets in which the times indicated by the timestamps are separated by approximately $T_{EP}$, then the receiving audio device 102 may determine that no packets have been dropped. However, if the receiving audio device 102 determines that two timestamps are separated by a time T that is more than $T_{EP}$, and that there are no received packets with timestamps between those two timestamps, then the receiving audio device 102 may determine that at least one packet has been dropped. Moreover, the receiving audio device 102 may determine the number of those one or more dropped packets as a multiple of $T_{EP}$. In other words, the number of dropped packets, between those two received packets, may be determined to be equal to the $T_{EP}/T$, which may be rounded up or down as needed.

To increase the confidence of a dropped-packet determination, the receiving audio device 102 may determine one or more dropped packets using both the packet sequence numbers and the time stamps as discussed above. For example, if using the packet sequence numbers indicates a determination of one or more dropped audio packets and using the time stamps indicates a determination of one or more dropped audio packets, then based on both indicating one or more dropped packets, the receiving audio device 102 may determine that one or more packets have been dropped. In another example, if using the packet sequence numbers indicates a determination of a particular amount of one or more dropped audio packets (e.g., three packets) and using the time stamps indicates a determination of the same particular amount (e.g., three packets) of one or more dropped audio packets, then based on both indicating the same amount of one or more dropped packets, the receiving audio device 102 may determine that the particular amount (e.g., three packets) of one or more packets have been dropped. If only one of the two determinations (e.g., using sequence numbers and not using time stamps, or using time stamps and not using sequence numbers) indicates one or more dropped packets, then the receiving audio device 102 may not determine that one or more packets have been dropped. If the two determinations (using sequence numbers and using time stamps) indicate that packets have been dropped, but the determined numbers of dropped packets are different using the two methods, then the receiving audio device 102 may determine the number of dropped packets based on one of those methods, such as using the smaller number or the larger number of dropped packets, as desired. For example, for a given timeframe between two received packets, if the receiving audio device 102 determines using sequence numbers that two packets between those have been dropped, and if the receiving audio device 102 also determines using time stamps that three packets between those have been dropped, the receiving audio device 102 may determine that the lower amount (two packets) or the higher amount (three packets) have been dropped, as desired.

In addition to determining an order in which the data in the received packets is to be buffered and/or converted to analog signals, the receiving audio device 102 may further use the received timestamps to determine what the latency is of the network 103 for each received packet. This is because of how the timestamps may be generated. For example, each timestamp may be generated based on a value of the network clock 206 known by the network stack and controller 205 of the sending audio device 101, where the network clock 206 of the sending audio device 101 may be synchronized with the master clock of the network 103. The receiving audio device 102 may have its own network clock 206 that is also synchronized with the master clock of the network 103. Thus, the receiving audio device 102 may determine, based on the timestamp of a received packet and its own generated network clock 206, what the latency of the received packet is (for example, how long it has been since the sending audio device 102 sent the packet). For example, the receiving audio device 102 may compare the timestamp of the received packet with the value of its network clock 206 (or with some value derived from the value of the network clock 206) when the packet is received. The receiving audio device 102 may perform some action based on the determined latency. For example, if the latency becomes very large (for example, if the latency is determined to exceed a known threshold value), the receiving audio device 102 may take a first action such as adding filler data (for example, zeros or interpolated audio data) to the audio data stored in the receiver buffer 207, or the receiving audio device 102 may send a signal to the sending audio device 101 to indicate to the sending audio device 101 that the receiving audio device 102 is experiencing high latency, or the audio device 102 may present a message to a user (for example, via a display or other user interface) to indicate that the audio device 102 is experiencing high latency. Similarly, if the latency is determined to fall below the threshold value, then the receiving audio device 102 may take a second action such as modifying the data in the receiver buffer 207, for example by removing (e.g., deleting, ignoring, or overwriting) a subset of the data from the buffer 207. The receiving audio device 102 may also use timestamps to determine the overall system audio latency, and may adjust the amount of audio stored in its buffer 207 (and/or use sample rate conversion) to achieve a target latency. For example, the receiving audio device 102 may be configured with a set-point of how full the buffer 207 should be. The receiving audio device 102 may determine latency from the timestamps in received packets by comparing the received timestamps with its own clock or with the network clock. The receiving audio device 10 may respond to the determined latency by dropping data from the buffer 207 or otherwise time-correcting data in the buffer, and/or storing generated, time-corrected, and/or interpolated data in the buffer 207, to maintain the buffer 207 near or at the set-point. By maintaining the buffer 207 fullness at or near the set-point, the receiving audio device 102 may provide audio that is approximately of the same latency regardless of the transmitting source of the audio and regardless of network path of the audio. For example, if the receiving audio device 102 receives audio from two transmitting audio devices, where audio from one of the transmitting audio devices is delayed (experiences latency) greater than the other of the transmitting audio devices, then one or more portions of audio data the less latent (less delayed) transmitting audio device may be dropped from being stored, or otherwise time-corrected, in the buffer 207, and/or one or more portions of audio data may be manufactured, time-corrected, and/or interpolated by the receiving audio device 102 to fill in latent gaps that would otherwise occur in the audio data stored in the buffer 207. The receiving audio device 102 may further select a target latency, such as a target latency based on a known or expected network latency, such as a target latency that is slightly greater than the known or expected network latency.

The receiving audio device 102 may further determine a rate at which data (e.g., a sample rate or a packet rate) is received by the audio device 102, and the receiving audio device 102 may take one or more actions based on the determined data rate. For example, the receiving audio device 102 may measure, over time, the rate at which packets are received at the network stack and controller 205, and/or the receiving audio device 102 may measure, over time, the rate of audio samples being received by or stored in the receiver buffer 207. The receiving audio device 102 may compare the measured rate with a threshold rate, and may take one or more actions based on the comparison. For example, the receiving audio device 102 may compare the measured packet rate with a threshold packet rate or compare the measured sample rate with a threshold sample rate, or compare any other measurement of an incoming data rate with a threshold data rate. The threshold sample rate may be any rate such as, for example, 96 samples every two milliseconds (or 48 samples every millisecond), which may be equivalent to an expected 48 kHz audio rate. Where the audio rate is expected to be at another rate, the threshold may be a different value. For example, where the expected audio rate is 32 kHz, the threshold sample rate may be 32 kHz (e.g., 32 samples every millisecond or 64 samples every two milliseconds). In still further examples, the threshold data rate may be equal to the nominal clock rate of the local asynchronous media clock 203. If the measured data rate (e.g., sample rate or packet rate) is below the threshold, then the receiving audio device 102 may pack the receiver buffer 207 such as by adding data to the receiver buffer 207 sufficient to approximately make up the missing expected data and approximately achieve the expected data rate. The added data may be a predetermined value, such as all zeroes, or it may be other data such as audio data interpolated from the actually received audio data. If the measured data rate (e.g., sample rate or packet rate) is above the threshold, then the receiving audio device 102 may drop data from being saved in the receiver buffer 207, sufficient to approximately result in the expected data rate. Where the threshold data rate is equal to (or otherwise based on) the nominal clock rate of the local asynchronous media clock 203), then the DAC 208 (which may operate in accordance with the local asynchronous media clock 203) may be able to continuously extract data from the receiver buffer 207 at the rate controlled by the local asynchronous media clock 203. Ideally, this process may generally cause the receiver buffer 207 to be partially full at all times, while potentially avoiding an underflow condition or overflow condition of the receiver buffer 207. In addition, if the measured data rate (e.g., sample rate or packet rate) is above or below the threshold, then the audio device 102 may perform sample rate conversion, such as discussed below with respect to a sample rate converter 301 and with respect to FIG. 3.

Thus, each audio device in the audio system 100 may operate using a combination of asynchronous and synchronous clocks. Specifically, for example, each audio device in the audio system 100 may generate its network clock 206 based on the master clock of the network 103, for example by synchronizing its own network clock 206 with the master clock in accordance with IEEE 1588-2008 or IEEE 1588-2019. That network clock 206 may be used for one or more aspects of communications between the audio devices 101 and 102 via the network 103 (for example, the network clock 206 may be used to generate timestamps for the packets). Moreover, each audio device in the audio system 100 may generate its own local asynchronous media clock 203 that is asynchronous from both the network clock 206 and from the master clock of the network 103. That local asynchronous media clock 203 may be used to govern communications and/or processing within the audio device and/or with respect to the media source 102 and/or the media receiver 209. Specifically, for example, the local asynchronous media clock 203 may be used to control the rate at which the analog audio signal from the media source 201 is converted, by the ADC 202, to the digital audio signal that is stored in the sender buffer 204. In addition or alternatively, the local asynchronous media clock 203 may be used to control the rate at which the digital audio signal from the receiver buffer 207 is converted, by the DAC 208, to the analog audio signal that is received by the media receiver 209.

Figure 3:
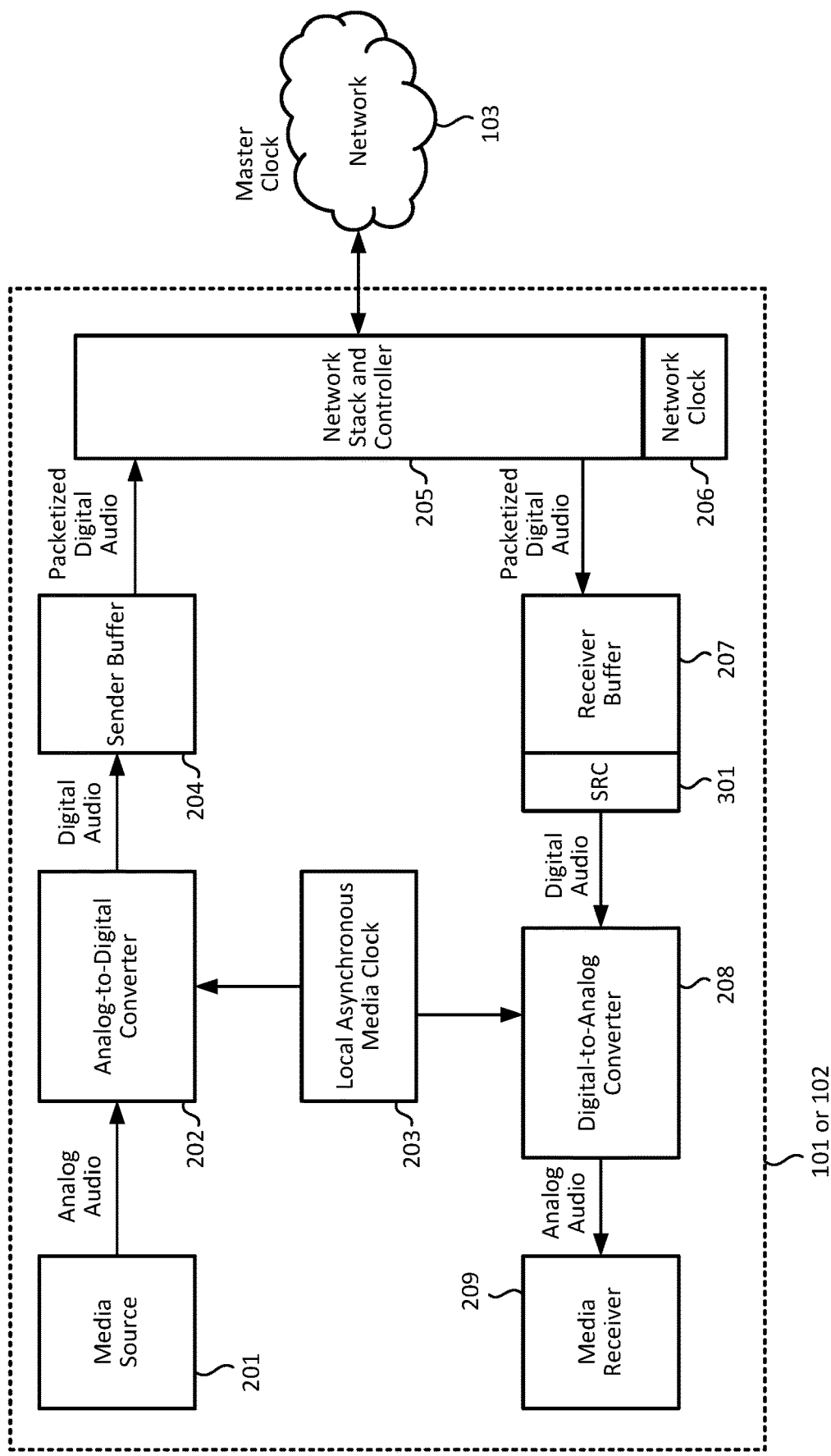
FIG. 3 is a block diagram showing another example of details of an audio device that may be part of an audio system, such as the audio system of FIG. 1.

FIG. 3 is a block diagram showing another example of details of an audio device that may be part of an audio system, such as the audio system of FIG. 1. In this example, the audio device 101 or 102 may include any of the elements as discussed above with respect to FIG. 2, and may also include a sample rate converter (SRC) 301. The SRC 301 may help to reduce the amount of overrun or underrun that may otherwise be experienced by the receiver buffer 207. The SRC 301 may receive digital audio data that is stored in the receiver buffer 207 and convert that digital audio data to a different sample rate. For example, if the digital audio data represents audio sampled at a first rate R1, then the SRC 301 may convert the digital audio data to represent audio sampled at a second rate R2. R2 may be a faster rate than R1, or R2 may be a slower rate than R1. Where the SRC 301 is converting from a slower rate R1 to a faster rate R2, then the SRC 301 may perform an up-sampling process, such as by inserting extra digital audio data between existing R1-rate samples. The inserted digital audio data may, for example, be of a predetermined one or more values (e.g., all zeros, sometimes referred to as "zero-stuffing") or may be interpolated values that are calculated based on the original digital audio data values. Where the SRC 301 is converting from a faster rate R1 to a slower rate R2, then the SRC 301 may perform a down-sampling process, such as by removing a selected subset of the original digital audio data values/samples. However, other up-sampling or down-sampling processes may be used. The SRC 301 may be used to effectively translate the digital audio data to be sampled at a rate consistent with one clocking domain (e.g., frequency and/or phase) to be sampled at a rate consistent with another different clocking domain (e.g., another different frequency and/or phase). For example, rate R1 may be the rate at which packets are received from the network stack and controller 205 by the receiver buffer 207 (where R1 may be based on the frequency of the local asynchronous media clock 203 of the sending audio device), and rate R2 may be the nominal frequency of the local asynchronous media clock 203 of the receiving audio device. Thus, the SRC 301 may be used to at least partially compensate for a mismatch in the two local asynchronous media clocks 203 of the sending and receiving audio devices. While the SRC 301 is shown after the receiver buffer 207 (e.g., between the receiver buffer 207 and the DAC 208), the SRC 301 may alternatively be located before the receiver buffer 207 (e.g., between the network stack and controller 205 and the receiver buffer 207). In addition or as an alternative to providing a receiver-side SRC that works in conjunction with the receiver buffer, a sender-side SRC may be added to work in conjunction with the sender buffer 204, such as between the ADC 202 and the sender buffer 204 or between the sender buffer 204 and the network stack and controller 205. In this case, the send-side SRC may convert a sample rate of the digital audio received from the ADC 202 to a different sample rate of audio data to be stored in the sender buffer 204 and/or to be sent to the network stack and controller 205.

Figure 4:
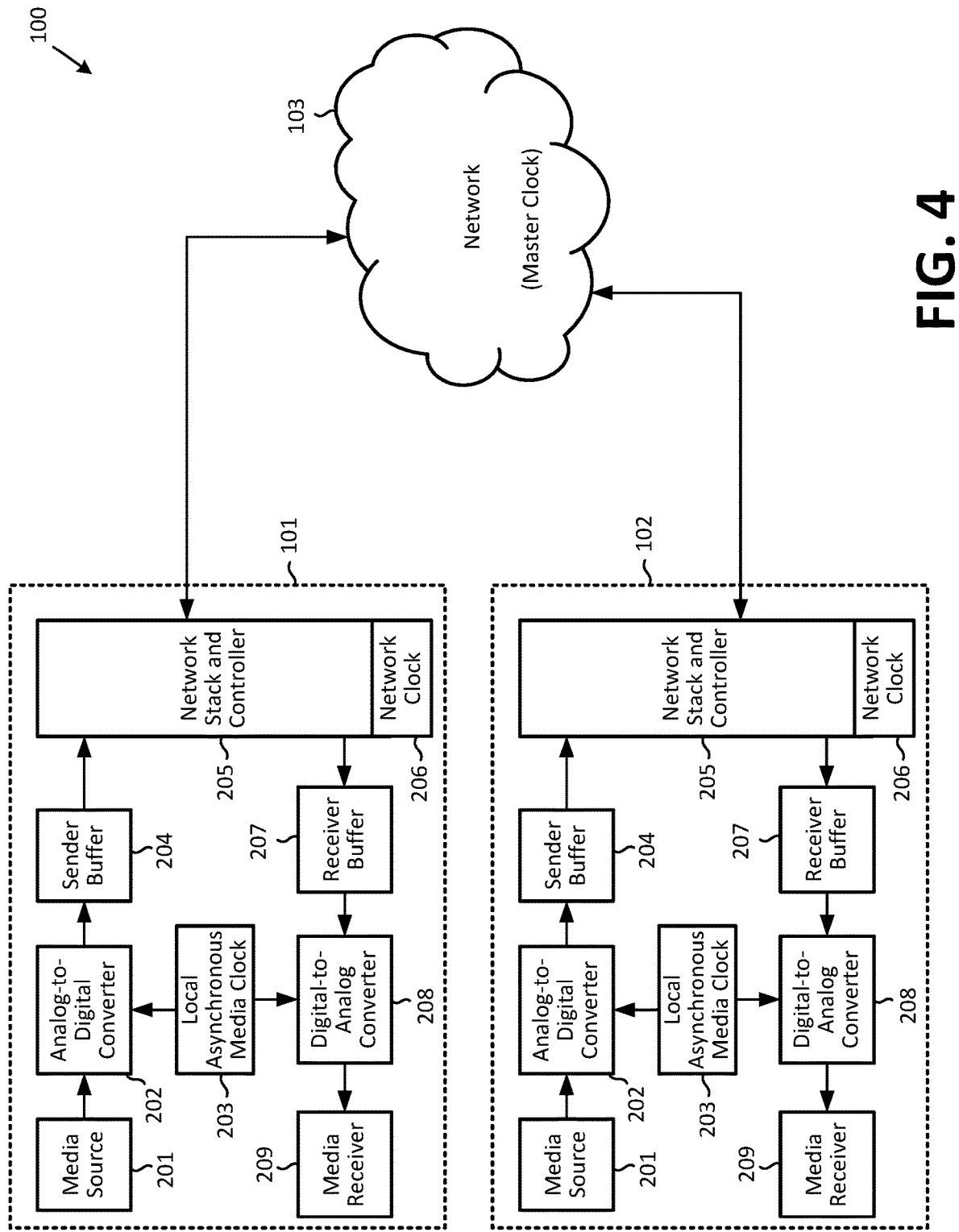
FIG. 4 is a block diagram of an example audio system, such as the audio system of FIG. 1, including example details of two audio devices in the audio system.

FIG. 4 is a block diagram of an example audio system, such as the audio system of FIG. 1, including example details of two audio devices in the audio system. In the illustrated example, the audio device 101 may be communicatively coupled with the audio device 102 via the network 103. Each of the audio devices 101 and 102 may operate such as in accordance with the description herein with regard to FIG. 2 and/or FIG. 3. Thus, for example, the audio device 101 may send audio data packets to the audio device 102 via the network 103. Moreover, the audio device 102 may send audio data packets to the audio device 101 via the network 103. While a two-way communication is shown between the two audio devices 101 and 102, in other example, the audio device 101 may send audio data packets to the audio device 102 and not receive any audio data packets from the audio device 102, or vice-versa. In such an example, the audio device 101 may not include, for example, elements 207-209, and the audio device 102 may not include, for example, elements 201, 202, and 204.

An example of how the system of FIG. 4 may operate is described as follows. The audio device 101 may include or otherwise be connected to its media source 201. The media source 201 of the audio device 201 may be, for example, a microphone and related circuitry for operating the microphone. The microphone may generate an analog audio signal, which the ADC 202 of the audio device 101 may receive and convert to a digital audio signal. The analog-to-digital conversion by the ADC 202 may be performed at a rate and/or phase that is based on (e.g., synchronized with) the rate (frequency) and/or phase of the local asynchronous media clock 203 of the audio device 101. The digital audio signal may be received by the sender buffer 203 of the audio device 101, which may store digital audio data based on the digital audio signal. The sender buffer 204 may packetize the stored digital audio into packets (e.g., IP datagrams) and send those packets to the network stack and controller 205 of the audio device 101. The packetizing of the stored digital audio data and/or the sending of the packets may be done at a rate and/or phase that is based on (e.g., synchronized with) the rate (frequency) and/or phase of the local asynchronous media clock 203 or the network clock 206. The network stack and controller 205 of the audio device may further packetize the packets, such as by encapsulating the IP datagrams in Ethernet frames, and send those finally-processed packets to the audio device 102 via the network 103. The sending of the packets via the network 103 may be performed at a rate and/or phase that is based on (e.g., synchronized with) the rate (frequency) and/or phase of the master clock.

After the packets traverse the network 103, they may be received by the network stack and controller 102 of the audio device 102, which may at least partially de-packetize the received packets (for example, by extracting IP datagrams from encapsulating Ethernet frames) and send the resulting audio data packets (e.g., IP datagrams) to the receiver buffer 207 of the audio device 102. The receiving of the packets from the network 103 may be performed at a rate and/or phase that is based on (e.g., synchronized with) the rate (frequency) and/or phase of the master clock. The receiver buffer 207 of the audio device 102 may further de-packetize the audio packets received from the network stack and controller 205, and extract and store the audio data in the audio packets. For example, the receiver buffer 207 may extract the audio data stored in IP datagrams received from the network stack and controller 205. The de-packetizing of the audio packets and storing of the digital audio data, by the receiver buffer 207 of the audio device 102, may be performed at a rate and/or phase that is based on (e.g., synchronized with) the rate (frequency) and/or phase of the network clock 206 of the audio device 102 or the local asynchronous media clock 203 of the audio device 102. The DAC 208 of the audio device 102 may receive the stored digital audio data from the receiver buffer 207, and may convert the received digital audio data into an analog audio signal that may be sent to the media receiver 209 of the audio device 102. The digital-to-analog conversion may be performed at a rate and/or phase that is based on (e.g., synchronized with) the rate (frequency) and/or phase of the local asynchronous media clock 203 of the audio device 102. The media receiver 209 of the audio device 102 may then process the received analog audio signal. For example, where the media receiver 209 of the audio device 102 is a speaker, the media receiver 209 may generate sound based on the analog audio signal.

The flow of audio may also travel from the audio device 102 to the audio device 101, with the operation thereof being the same as described above with respect to FIG. 4, except that references to the audio device 101 and the audio device 102 may be reversed. Moreover, the audio device 101 may send audio to the audio device 102 simultaneously with receiving audio from the audio device 102, and vice-versa. While only two audio devices 101 and 102 are shown in FIG. 4, the audio system 100 may include more than two audio devices, such as three audio devices, four audio devices, or more, interconnected together via the network 103. Where there are three or more audio devices in the audio system 100, any given audio device may send audio to two or more other audio devices (simultaneously or otherwise), and any audio device may receive audio from two or more other audio devices (simultaneously or otherwise). For example, an audio device may send packets via the network 103 that are addressed to one or more other audio devices. The audio packets between any one or more audio devices and another one or more audio devices may be sent via one or more streams, such as one or more IP streams.

The local asynchronous media clocks 203 of each of the audio devices 101 and 102 may be asynchronous from one another and from any other clocks in the system 100. Thus, for example, the local asynchronous media clock 203 of the audio device 101 may include a first oscillator, and the local asynchronous media clock 203 of the audio device 102 may include a second oscillator independent from the first oscillator. Each of the two local asynchronous media clocks 203 may be implemented using a technology that generally results in a lower-precision clock, such as using a crystal-based oscillator, a ceramic resonator, a MEMS oscillator, a SAW oscillator, or an LC oscillator, as non-limiting examples. The local asynchronous media clocks 203 of the multiple audio devices 101 and 102 may have the same nominal frequency or have different nominal frequencies. For example, the local asynchronous media clock 203 of the audio device 101 may have a nominal frequency of 32 kHz and the local asynchronous media clock 203 of the audio device 102 may have a nominal frequency of 48 kHz. Or, the local asynchronous media clocks 203 of the audio devices 101 and 102 may both have a nominal frequency of 32 kHz, or may both have a nominal frequency of 48 kHz. The particular frequency values mentioned here are merely examples; any one or more nominal frequencies of the local asynchronous media clocks 203 may be used.

The multiple audio devices in the audio system 100 (e.g., the audio devices 101 and 102) may send non-audio data in addition to the audio data via the network 103. Examples of such non-audio data may include configuration settings, status indications, capability indications, or handshaking protocol signaling. For example, the audio devices may communicate with one another to indicate the nominal frequencies of their local asynchronous media clocks 203, or to indicate one or more configured or preferred audio compression settings (for example, a configured, available, or preferred one or more compression ratios) or audio compression methods (for example, a configured, available, or preferred one or more types of coder/decoder (CODEC) to be used). Any types of indications may be used. For example, to indicate a 48 kHz clock rate, a data packet may be sent by an audio device that includes the number "48" or "48,000." Or, the audio device may send a data packet indicating a particular shorthand value known by the other audio devices in the audio system 100, for example, 32 kHz may be signified by a particular bit being set to zero, and 48 kHz may be signified by the particular bit being set to one. Such non-audio data may be sent in data packets (for example, datagrams) dedicated to non-audio data, in which case the non-audio data packets may be distinguished from the audio data packets such as by including first information in a packet header to indicate a non-audio data packet and including different second information in a packet header to indicate an audio data packet. Alternatively, both audio and non-audio data may be combined together within the same data packet. In either case, audio and non-audio data may each be included in one or more payload portions of one or more packets. One potential advantage of the audio devices communicating such information to one another, is that the audio devices may use this communicated information to configure themselves in a particular way, to cause others of the audio devices in the audio system 100 to configured themselves in a particular way, or to generally negotiate one or more particular configurations such that the audio devices in the audio system 100 will operate and communicate with one another in a compatible way. For example, two audio devices in the audio system 100 may have two different local asynchronous media clock rates, and may use exchanged clock rate information or other configuration information to negotiate a particular audio compression ratio based on one or both of the respective local asynchronous media clock rates. Such negotiation may be automatically performed amongst the audio devices in the audio system 100. This may provide simplicity to the user of the audio system 100, in that the user may not need to be concerned with the local asynchronous media clock rates of the various audio devices in the audio system 100, thereby potentially providing flexibility in selecting audio devices to interwork in the audio system 100.

Figure 5:
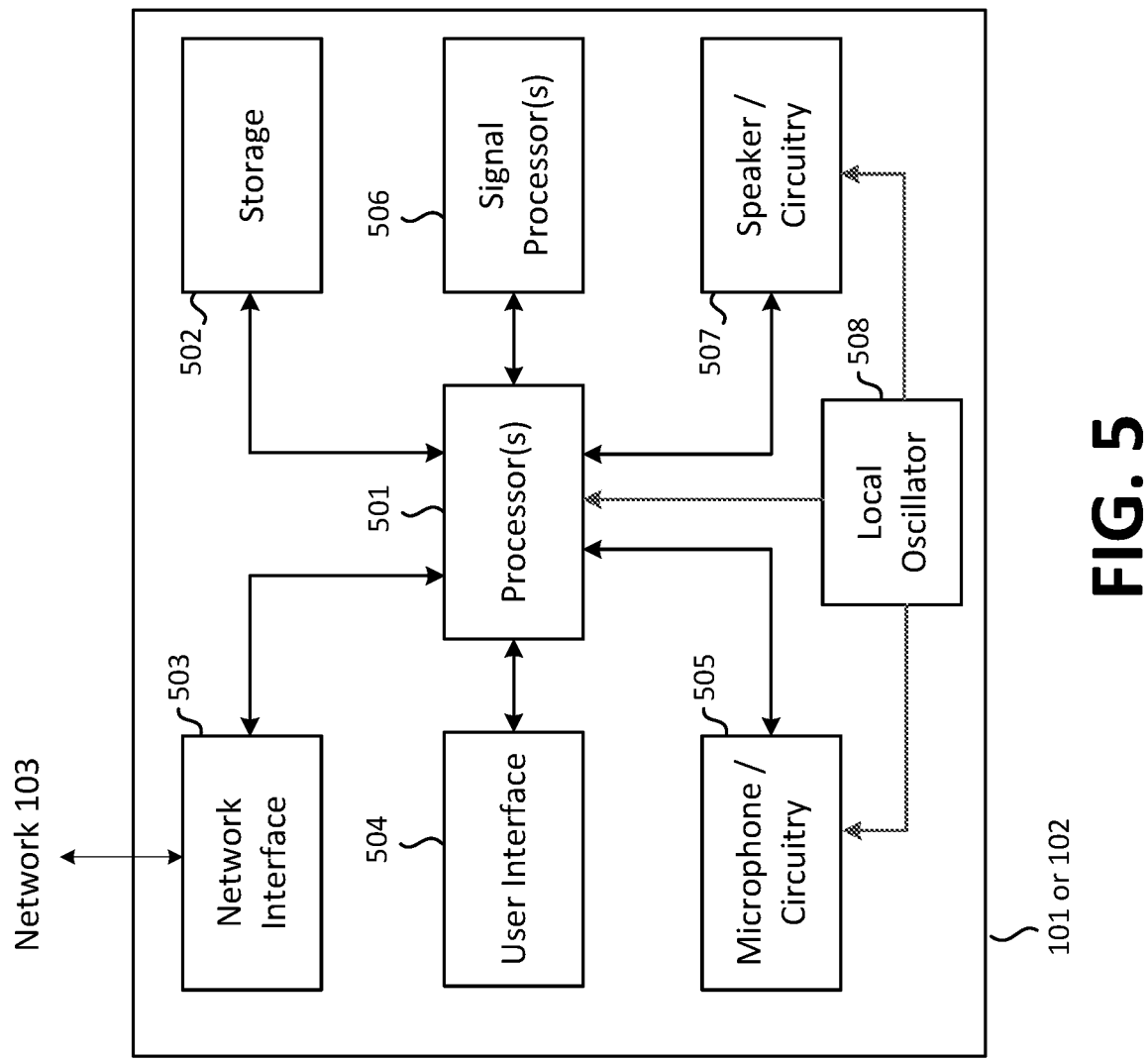
FIG. 5 is a block diagram showing example details of an audio device that may be part of an audio system, such as the audio system of FIG. 1.

FIG. 5 is a block diagram showing example details of an audio device that may be part of an audio system, such as the audio system of FIG. 1. For example, the audio device may be the audio device 101 or the audio device 102. The audio device may be implemented as or may otherwise include, for example, a computing device that executes stored instructions, and/or as hard-wired circuitry and or one or more processors may execute stored computer-readable instructions. In the shown example, the computing device may comprise or be connected to any of the following: one or more processors 501, storage 502 (which may comprise one or more computer-readable media such as memory), an external interface such as a network interface 503 (which may be configured to communicate with the network 103), a user interface 504, one or more microphones and/or associated circuitry 505 configured to detect sound and convert that detected sound into an audio signal such as analog audio signal or a digital audio signal, one or more digital signal processors 506 configured to implement one or more digital signal processing features of the audio device, one or more speakers and/or associated circuitry 507 configured to produce sound in response to a received audio signal such as an analog audio signal or a digital audio signal, and/or a local oscillator 508. The one or more processors 501 may be communicatively connected to any of the other elements 502-508 via one or more data buses and/or via one or more other types of connections.

In the example of FIG. 5, the media source 201 is shown as being the one or more microphones of element 505 and the media receiver 209 is shown as being the one or more speakers of element 507. However, the media source 201 and the media receiver 209 may be any other types of media sources and media receivers as discussed above. The ADC 202 and/or the sender buffer 204 may be implemented by the circuitry of element 505 and/or the one or more processors 501, and the DAC 208 and/or the receiver buffer 207 may be implemented by the circuitry of element 507 and/or the one or more processors 501. The circuitry of elements 505 and 507 may be separate circuitry or a single instance of combined circuitry, as desired. The network stack and controller 205, and/or the network clock 206, may be implemented by the network interface 503 and/or the one or more processors 501. The local asynchronous media clock 203 may be implemented by the local oscillator 508. In the shown example, the local oscillator 508 may provide the local asynchronous media clock signal to the one or more processors 501, the circuitry of element 505 (for example, to control the operation of the ADC 202 and/or the sender buffer 204), and the circuitry of element 507 (for example, to control the operation of the DAC 208 and/or the receiver buffer 207). However, the local asynchronous media clock signal may be provided to any of the elements of FIG. 5, as desired. In an example, the one or more processors 501 may receive a signal from the local oscillator 508, and the one or more processors 501 may generate the asynchronous local media clock based on the signal from the local oscillator 508. For example, the one or more processors 501 may comprise phase-locked loop (PLL) circuitry, and the signal from the local oscillator 508 may be an input to (e.g., for driving) the PLL circuitry.

The one or more processors 501 may be configured to execute instructions stored in storage 502. The instructions, when executed by the one or more processors 501, may cause the computing device (and thus the audio device) to perform any of the functionality described herein that is performed by the audio device (such as the audio device 101 or the audio device 102). For example, the one or more processors 501 may control the operation of any of the other elements 502-508 of the audio device, and/or may direct various signals (such as audio signals and/or clock signals) amongst the various elements 502-508 of the audio device.

Power may be provided to the audio device and/or to any of the elements of the audio device (e.g., any of the elements 501-508) as desired. While not explicitly shown, the audio device may include an internal battery and/or an external power connection.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. A method comprising:
  receiving, via a network and based on a network clock that is synchronized with a master clock of the network, digital audio data;
  generating a local asynchronous media clock;
  comparing a rate of the received digital audio data with a threshold data rate, wherein the threshold data rate is based on a nominal rate of the local asynchronous media clock;
  storing at least a portion of the received digital audio data in a buffer, wherein the at least the portion of the received digital audio data is based on the comparing;
  generating, using the local asynchronous media clock and based on the at least the portion of the digital audio data stored in the buffer, an analog audio signal; and
  generating sound, using a speaker, based on the analog audio signal.

Clause 2. The method of clause 1, wherein the generating the local asynchronous media clock comprises generating the local asynchronous media clock using a low-precision clocking technology, for example using at least one of the following: a crystal-based oscillator, a MEMS oscillator, a ceramic resonator, a SAW oscillator, or an LC oscillator.

Clause 3. The method of clause 1 or clause 2, wherein the receiving the digital audio data based on the network clock comprises receiving the digital audio data based on a plurality of timestamps that were generated based on the network clock and/or based on a plurality of sequence numbers included in the digital audio data.

Clause 4. The method of any one of clauses 1-3, further comprising buffering the digital audio data in a plurality of buffer locations that are based on the plurality of timestamps and/or based on the plurality of sequence numbers.

Clause 5. The method of any one of clauses 1-4, further comprising dropping, based on the comparing, at least some of the received digital audio data from being stored in the buffer.

Clause 6. The method of any one of clauses 1-4, further comprising packing, based on the comparing, additional data in the buffer.

Clause 7. The method of any one of clauses 1-6, wherein the receiving the digital audio data comprises receiving a plurality of data packets comprising the digital audio data, the method further comprising extracting the digital audio data from the plurality of data packets.

Clause 8. The method of clause 7, wherein the plurality of data packets comprises one or both of: a plurality of Internet Protocol datagrams or a plurality of Ethernet frames.

Clause 9. The method of clause 7 or clause 8, wherein the extracting is governed by the local asynchronous media clock.

Clause 10. The method of any one of clauses 1-9, wherein the receiving is performed by a first audio device, the method further comprising:
  receiving a second analog audio signal based on detected sound;
  generating, using the local asynchronous media clock and based on the second analog audio signal, second digital audio data; and
  sending, via the network, the second digital audio data.

Clause 11. The method of any one of clauses 1-10, further comprising decompressing the at least the portion of the digital audio data, wherein the generating the analog audio signal based on the at least the portion of the digital audio signal comprises generating the analog audio signal based on the decompressed digital audio data.

Clause 12. The method of any one of clauses 1-11, further comprising decrypting the at least the portion of the digital audio data, wherein the generating the analog audio signal based on the at least the portion of the digital audio signal comprises generating the analog audio signal based on the decrypted digital audio data.

Clause 13. The method of any one of clauses 1-12, wherein the storing is governed by the local asynchronous media clock.

Clause 14. The method of any one of clauses 1-13, wherein the generating the analog audio signal based on the digital audio data comprises converting, using a digital-to-analog converter, the at least the portion of the digital audio data stored in the buffer to the analog audio signal.

Clause 15. The method of clause 14, further comprising performing sample rate conversion on the at least the portion of the digital audio data stored in the buffer.

Clause 16. The method of any one of clauses 1-15, further comprising determining one or more dropped packets based on received packet sequence numbers and/or received packet timestamps, and adjusting data in a receive buffer based on the determination of one or more dropped packets.

Clause 17. A first audio device comprising:
  one or more processors; and
  one or more computer-readable media storing instructions that, when executed by the one or more processors, cause the first audio device to perform the method of any one of clauses 1-16.

Clause 18. A non-transitory computer-readable medium storing instructions that, when executed, cause a first audio device to perform the method of any one of clauses 1-16.

Clause 19. A method comprising:
  receiving an analog audio signal based on detected sound;
  generating a local asynchronous media clock;
  generating, using the local asynchronous media clock and based on the analog audio signal, digital audio data;
  generating, based on a master clock of a network, a network clock; and
  sending, via the network and based on the network clock, the digital audio data.

Clause 20. The method of clause 19, wherein the generating the local asynchronous media clock comprises generating the local asynchronous media clock using a low-precision clocking technology, for example using at least one of the following: a crystal-based oscillator, a MEMS oscillator, a ceramic resonator, a SAW oscillator, or an LC oscillator.

Clause 21. The method of clause 19 or clause 20, further comprising packetizing the digital audio data into a plurality of data packets, wherein the sending comprises sending the plurality of data packets.

Clause 22. The method of any one of clauses 19-21, wherein the plurality of data packets comprises one or both of: a plurality of Internet Protocol datagrams or a plurality of Ethernet frames.

Clause 23. The method of any one of clauses 19-22, wherein the packetizing is governed by the local asynchronous media clock.

Clause 24. The method of any one of clauses 19-23, wherein the sending the digital audio data based on the network clock comprises sending the digital audio data in a plurality of packets each comprising a timestamp that is based on the network clock and/or each comprising a sequence number.

Clause 25. The method of any one of clauses 19-24, wherein the sending the digital audio data comprises sending the digital audio data in a plurality of packets at a rate that is based on a frequency of the local asynchronous media clock.

Clause 26. The method of any one of clauses 19-25, wherein the sending is performed by a first audio device, the method further comprising:
  receiving, by the first audio device, via the network, second digital audio data;
  generating, using the local asynchronous media clock and based on the digital audio data, a second analog audio signal; and
  generating sound, using a speaker associated with the first audio device, based on the second analog audio signal.

Clause 27. The method of any one of clauses 19-26, further comprising compressing the digital audio data, wherein the sending comprises sending the compressed digital audio data.

Clause 28. The method of any one of clauses 19-27, further comprising encrypting the digital audio data, wherein the sending comprises sending the encrypted digital audio data.

Clause 29. The method of any one of clauses 19-28, further comprising storing the digital audio data in a buffer, wherein the storing is governed by the local asynchronous media clock.

Clause 30. The method of any one of clauses 19-29, wherein the sending is performed by a first audio device, the method further comprising:
  generating, using a second crystal-based oscillator, a second local asynchronous media clock;
  receiving, by a second audio device, via the network, the digital audio data; and
  generating, using the second local asynchronous media clock and based on the received digital audio data, a second analog audio signal.

Clause 31. The method of clause 30, further comprising buffering the received digital audio data in a buffer location that is based on a timestamp and/or a sequence number associated with the received digital audio data.

Clause 32. The method of clause 31, further comprising generating, based on the master clock of the network, a second network clock, wherein the buffer location is based on both the timestamp and the second network clock.

Clause 33. The method of any one of clauses 30-32, further comprising generating sound, using a speaker associated with the second audio device, based on the second analog audio signal.

Clause 34. The method of any one of clauses 30-33, wherein the local asynchronous media clock has a nominal first clock frequency and the second local asynchronous media clock has a nominal second clock frequency, and wherein the nominal first clock frequency is different from the nominal second clock frequency.

Clause 35. The method of any one of clauses 30-33, wherein the local asynchronous media clock has a nominal first clock frequency of one of 32 kHz or 48 KHz, and wherein the second local asynchronous media clock has a different nominal second clock frequency of the other of 32 KHz or 48 KHz.

Clause 36. A first audio device comprising:
  one or more processors; and
  one or more computer-readable media storing instructions that, when executed by the one or more processors, cause the first audio device to perform the method of any one of clauses 19-29.

Clause 37. A system comprising:
  a first audio device comprising:
    one or more processors; and
    one or more computer-readable media storing instructions that, when executed by the one or more processors of the first audio device, cause the first audio device to perform the method of any one of clauses 19-29; and
  a second audio device comprising
    one or more processors; and
    one or more computer-readable media storing instructions that, when executed by the one or more processors of the second audio device, cause the second audio device to perform the steps further recited in any one of clauses 30-35.

Clause 38. A non-transitory computer-readable medium storing instructions that, when executed, cause a first audio device to perform the method of any one of clauses 19-29.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. An audio device comprising:
  a local asynchronous media clock having a frequency variation of at least one part per million;
  a buffer;
  one or more processors; and
  one or more computer-readable media storing instructions that, when executed by the one or more processors, configure the audio device to:
    receive, via a network and based on a network clock that is synchronized with a master clock of the network, digital audio data;
    compare a rate of the received digital audio data with a threshold data rate, wherein the threshold data rate is based on a nominal rate of the local asynchronous media clock;
    store at least a portion of the received digital audio data in the buffer, wherein the at least the portion of the received digital audio data is based on comparing the rate of the received digital audio data with the threshold data rate;
    generate, using the local asynchronous media clock and based on the at least the portion of the digital audio data stored in the buffer, an audio signal; and
    send the audio signal for sound generation by a speaker.

2. The audio device of claim 1, wherein the local asynchronous media clock comprises one or more of: a crystal-based oscillator, a microelectromechanical system oscillator (MEMS) oscillator, a ceramic resonator, a surface acoustic wave (SAW) oscillator, or an inductor/capacitor (LC) oscillator.

3. The audio device of claim 1, wherein the instructions, when executed by the one or more processors, configure the audio device to drop, based on the comparing, at least some of the received digital audio data from being stored in the buffer.

4. The audio device of claim 1, wherein the digital audio data comprises one or both of a plurality of timestamps or a plurality of packet sequence numbers, and wherein the instructions, when executed by the one or more processors, configure the audio device to perform, based on one or both of the plurality of sequence numbers or the plurality of timestamps, at least one of:
dropping at least some of the received digital audio data from being stored in the buffer;
storing locally-generated audio data in the buffer;
interpolating data in the buffer; or
time-correcting data in the buffer.

5. The audio device of claim 1, wherein the instructions, when executed by the one or more processors, configure the audio device to receive the digital audio data by at least:
receiving a plurality of data packets comprising the digital audio data; and
extracting the digital audio data from the plurality of data packets.

6. The audio device of claim 1, wherein the instructions, when executed by the one or more processors, configure the audio device to extract the digital audio data from a plurality of data packets with a timing that is governed by the local asynchronous media clock.

7. The audio device claim 1, wherein the instructions, when executed by the one or more processors, configure the audio device to store the at least the portion of the received digital audio data in the buffer using a timing that is governed by the local asynchronous media clock.

8. The audio device of claim 1, wherein the instructions, when executed by the one or more processors, configure the audio device to decompress the at least the portion of the digital audio data, and to generate the audio signal based on the at least the portion of the digital audio signal by at least generating the audio signal based on the decompressed at least the portion of the digital audio data.

9. The audio device of claim 1, wherein the instructions, when executed by the one or more processors, configure the audio device to decrypt the at least the portion of the digital audio data, and to generate the audio signal based on the at least the portion of the digital audio signal by at least generating the audio signal based on the decrypted at least the portion of the digital audio data.

10. The audio device of claim 1, wherein the instructions, when executed by the one or more processors, configure the audio device perform sample rate conversion on the at least the portion of the digital audio data stored in the buffer.

11. A method comprising:
receiving, from a transmitting audio device, via a network, and based on a network clock that is synchronized with a master clock of the network, digital audio data;
comparing a rate of the received digital audio data with a threshold data rate, wherein the threshold data rate is based on a nominal rate of a local asynchronous media clock, and wherein the local asynchronous media clock has a frequency that is different from a frequency of a local asynchronous media clock of the transmitting audio device;
storing at least a portion of the received digital audio data in a buffer, wherein the at least the portion of the received digital audio data is based on comparing the rate of the received digital audio data with the threshold data rate;
generating, using the local asynchronous media clock and based on the at least the portion of the digital audio data stored in the buffer, an audio signal; and
causing a speaker to generate sound based on the audio signal.

12. The method of claim 11, further comprising extracting the digital audio data from a plurality of data packets with a timing that is governed by the local asynchronous media clock.

13. The method of claim 11, further comprising storing the at least the portion of the received digital audio data in the buffer using a timing that is governed by the local asynchronous media clock.

14. A non-transitory computer-readable medium storing instructions that, when executed, configure an audio device to:
receive, from a transmitting audio device, via a network, and based on a network clock that is synchronized with a master clock of the network, digital audio data;
compare a rate of the received digital audio data with a threshold data rate, wherein the threshold data rate is based on a nominal rate of a local asynchronous media clock, and wherein the local asynchronous media clock has a frequency that is different from a frequency of a local asynchronous media clock of the transmitting audio device;
store at least a portion of the received digital audio data in a buffer, wherein the at least the portion of the received digital audio data is based on comparing the rate of the received digital audio data with the threshold data rate;
generate, using the local asynchronous media clock and based on the at least the portion of the digital audio data stored in the buffer, an audio signal; and
cause a speaker to generate sound based on the audio signal.

15. The non-transitory computer-readable medium of claim 14, wherein the instructions, when executed, further configure the audio device to extract the digital audio data from a plurality of data packets with a timing that is governed by the local asynchronous media clock.

16. The non-transitory computer-readable medium of claim 14, wherein the instructions, when executed, further configure the audio device to store the at least the portion of the received digital audio data in the buffer using a timing that is governed by the local asynchronous media clock.

* * * * *